US009434009B2

(12) United States Patent
Kakimoto et al.

(10) Patent No.: US 9,434,009 B2
(45) Date of Patent: Sep. 6, 2016

(54) DRILL AND BORING DEVICE USING SAME

(75) Inventors: Masakazu Kakimoto, Nagoya (JP); Wataru Aoki, Nagoya (JP)

(73) Assignees: UHT CORPORATION, Togo-cho, Aichi-gun, Aichi (JP); BTT CORPORATION, Nagoya-shi, Aichi (JP)

( * ) Notice: Subject to any disclaimer, the term of this patent is extended or adjusted under 35 U.S.C. 154(b) by 286 days.

(21) Appl. No.: 14/118,371

(22) PCT Filed: May 8, 2012

(86) PCT No.: PCT/JP2012/061749
§ 371 (c)(1),
(2), (4) Date: Nov. 18, 2013

(87) PCT Pub. No.: WO2012/157468
PCT Pub. Date: Nov. 22, 2012

(65) Prior Publication Data
US 2014/0086697 A1 Mar. 27, 2014

(30) Foreign Application Priority Data
May 18, 2011 (JP) ................................. 2011-111798

(51) Int. Cl.
*B23B 47/34* (2006.01)
*B23B 51/00* (2006.01)
(Continued)

(52) U.S. Cl.
CPC ............. *B23B 47/34* (2013.01); *B23B 51/009* (2013.01); *B23B 51/108* (2013.01);
(Continued)

(58) Field of Classification Search
CPC . B23B 2251/68; B23B 51/108; B23B 47/34; B23B 51/009; B23B 2215/04; B23B 2226/275; B23B 2270/62; Y02P 70/171; B23Q 11/0046
See application file for complete search history.

(56) References Cited

U.S. PATENT DOCUMENTS 1,554,669 A * 9/1925 Watkins .................. B23B 5/168
407/40
2,829,544 A * 4/1958 Bergstrom .............. B23B 51/10
408/225

(Continued)

FOREIGN PATENT DOCUMENTS

EP 2140960 A2 1/2010
JP 64879/1973 8/1973
(Continued)

OTHER PUBLICATIONS

International Searching Authority, International Search Report for International Patent Application No. PCT/JP2012/061749, Nov. 22, 2012.
(Continued)

*Primary Examiner* — Sunil K Singh
*Assistant Examiner* — Alan Snyder
(74) *Attorney, Agent, or Firm* — Studebaker & Brackett PC

(57) ABSTRACT

Provided are a drill that enhances work efficiency and process accuracy of a boring process, and a boring device enabling dust collection and recovery by using the drill. In a drill formed with a chip exhaust 102 along a center of an axis in a drill body 101, a large-diameter cylindrical body 101a with an outer diameter increased via a different level part G or G' is provided on a base end side of the drill body 101, first cutting edges 110 are provided on a tip part of the drill body, first scrap lead pockets 112 leading to the chip exhaust are provided in the vicinity of the first cutting edges 110, second cutting edges 120 are provided on the different level part, and second scrap lead pockets 122 leading to the chip exhaust are provided in the vicinity of the second cutting edges 120. A boring device is configured cuch that a dust collection mechanism 50 is coupled to a back end of the chip exhaust 102 of the drill body, and produced chips are suction-recovered in the dust collection mechanism 50 by boring a work material W while a driving source rotates the drill body 101.

15 Claims, 10 Drawing Sheets

(51) Int. Cl.
  *B23B 51/10* (2006.01)
  *B23Q 11/00* (2006.01)
(52) U.S. Cl.
  CPC ...... *B23Q 11/0046* (2013.01); *B23B 2215/04* (2013.01); *B23B 2226/275* (2013.01); *B23B 2251/68* (2013.01); *Y02P 70/171* (2015.11); *Y10T 407/24* (2015.01)

(56) References Cited

U.S. PATENT DOCUMENTS

| | | | |
|---|---|---|---|
| 2,897,695 A * | 8/1959 | Winslow | B23B 51/108 408/223 |
| 7,575,401 B1 | 8/2009 | Garrick et al. | |
| 8,388,279 B2 * | 3/2013 | Kitsukawa | B23B 51/06 408/207 |
| 2009/0060670 A1 | 3/2009 | Sugano et al. | |
| 2009/0279975 A1 | 11/2009 | Tada et al. | |
| 2010/0266358 A1 * | 10/2010 | Hiramoto | B23Q 11/0046 409/137 |

FOREIGN PATENT DOCUMENTS

| | | |
|---|---|---|
| JP | 193610/1988 | 12/1988 |
| JP | 35653/1990 | 3/1990 |
| JP | 35654/1990 | 3/1990 |
| JP | 1990-237707 | 9/1990 |
| JP | 2011-000661 A | 1/2011 |
| JP | 2011101931 | 5/2011 |
| JP | 2011235407 | 11/2011 |
| WO | 2005049255 | 6/2005 |
| WO | 2009107235 | 9/2009 |
| WO | 2011049095 | 4/2011 |

OTHER PUBLICATIONS

European Patent Office, Extended European Search Report on EP Appln. No. 12785184.8, dated Sep. 17, 2014.

* cited by examiner (a)

(b)

(c)

(d)

(a)

(b)

(c)

(d)

(a)

(b)

(c)

(d)

(a)

(b)

(c)

(d)

(a)

(b)

(c)

(d)

(1)

(2)

(3)

(4)

DRILL AND BORING DEVICE USING SAME

TECHNICAL FIELD

The present invention relates to a drill and a boring device using the same, and more specifically to a drill formed with a chip exhaust in a drill body, and a boring device with a dust collection mechanism for a boring process using the drill, the boring device being suitable for a process of boring a work material (work) that is a fiber reinforced composite material, particularly a non-metal material such as CFRP (carbon-fiber reinforced plastic) that is main wing material for an a aircraft, and a vehicle body material for a vehicle, an Al alloy, or the like.

BACKGROUND ART

Generally, in a case where drill boring is performed for a CFRP material, a large amount of cutting powder resulting from fine carbon fibers that are cut during the process is mixed in chips. In a case where such cutting powder scatters in a workshop, a working environment remarkably deteriorates. To cope with this, for example, a worker wears a dustproof workwear, or a dust protective mask. However, since the cutting powder is fine powder of carbon fibers that are harmful to a human body, more reliable recovery of the chips is demanded.

Heretofore, in order to improve a working environment, there is proposed a tool in which a cylindrical drill is mounted on the tip of a hollow machine spindle (spindle), and chips produced during a boring process are suction-recovered in a dust collector through a shank of the cylindrical drill and a hollow part (suction hole) of the machine spindle (Patent Document 1).

Additionally, in a tool using a cylindrical drill similarly, it is proposed to hollow out a work material with a cylindrical drill, and suck a hollowed cut core through a drill hole with a vacuum suction device, in order to reduce the production amount of chips (Patent Document 2).

In order to improve defects of these conventional techniques, this applicant has proposed a boring device in which a hollow spindle is used as a spindle that rotates with a driving source, and a cylindrical drill having an edge part on a tip thereof is mounted on a tip of the hollow spindle, a dust collection mechanism is coupled to a passage back end in the hollow spindle via a chuck, a work material is bored while the driving source rotates the cylindrical drill via the hollow spindle, so that chips and a cut core produced are suction-recovered in the dust collection mechanism through the passage in the hollow spindle (Patent Document 3, Patent Document 4).

PRIOR ART DOCUMENT

[Patent Document 1] Japanese Utility Model Laid-open No. H 2-35653
[Patent Document 2] Japanese Patent Application Laid-open No. H 2-237707
[Patent Document 3] Japanese Patent Application No. 2009-257996
[Patent Document 4] Japanese Patent Application No. 2010-109657

SUMMARY OF THE INVENTION

The Patent Document 3 and Patent Document 4 each specifically disclose that a boring process is performed for a work material such as CFRP, but specify only a case where the work material is bored to be formed with a through hole whose inner diameter is uniform.

However, at an actual work site, a boring process for not only the through hole but also a countersink, a chamfering, a counter boring hole, etc. is required.
In this case, after the through hole is bored by using the boring drill, it is necessary to replace the drill with a drill for countersink or a drill for a counter boring hole to perform a required boring process again.

Therefore, a plurality of boring drills needs to be assorted, and furthermore, the replacement work of the drills requires troublesome labor, and high work efficiency cannot be expected. Moreover, defects in process accuracy, for example occurrence of core misalignment between the initial through hole and the subsequent countersink, counter boring hole, etc., are caused.

On the other hand, in a conventional general drill, such as a cylindrical drill, which does not form a chip exhaust in a drill body, and provides a chip exhaust groove on an outer periphery surface of the drill body, a structure enabling a chamfering or a counter boring process is proposed. However, since the shape or the arrangement structure of a chamfering edge or a counter boring edge thereof is complicated, molding may be difficult and such a structure does not yet put into use. Furthermore, assembling with the collection mechanism is remarkably difficult.

In order to solve the conventional defects, an object of the present invention is to provide a drill that not only bores a work material to merely form a through hole, etc. with the single drill, but also can perform a process for a countersink, chamfering, a counter boring hole, etc. without replacement of the drill according to need, and enhances work efficiency and process accuracy of the boring process.

Another object is to provide a boring device that enables this new drill to be relatively easily molded, facilitates assembling with the dust collection mechanism for chips, and enables reliable dust collection and recovery of chips (including an aspect where a cut core is included) produced during a boring process.

A drill according to the present invention is a drill having an inner passage that is formed along a center of an axis in a drill body and serves as a chip exhaust, and includes: a large-diameter cylindrical body having an outer diameter increased via a different level part, and coaxially provided on a base end side of the drill body; a first cutting edge provided on a tip part of the drill body and a first scrap lead pocket being opened toward a rotating direction front side of a verge line that extends backward from the first cutting edge and leading to the chip exhaust; and a second cutting edge provided on the different level part and a second scrap lead pocket being opened toward a rotating direction front side of verge lines that extend forward and backward from the second cutting edge and leading to the chip exhaust.

The drill body is a cylindrical drill disclosed in each of Patent Document 1-4, namely, has a structure in which the chip exhaust formed in the drill body penetrates from the base end side to the tip. Additionally, the drill body includes not only a drill formed with a first cutting edge (boring edge, drill edge) on the tip verge, but also a drill having a tip surface with a predetermined tip angle, closing a tip of the chip exhaust and formed with a first cutting edge on the tip surface.

A work material is bored by the first cutting edge to perform a boring process (a through hole or a blind hole), and chips (including a cut core) produced during the process enter in the chip exhaust through the first scrap lead pocket.

Additionally, at the end of the boring step, the boring process is continued by the second cutting edge, and chips produced during the process enter in the chip exhaust through the second scrap lead pocket.

According to an aspect of the different level part, the different level part is an inclined surface gradually increasing an outer diameter toward the base end side. In this case, the second cutting edge is a cutting edge for a countersink process or a chamfering process, which is formed on the inclined surface.

According to another aspect of the different level part, the different level part is a perpendicular surface orthogonal to the center of an axis of the drill body. In this case, the second cutting edge is a cutting edge for a counter boring process, which is formed on the perpendicular surface.

As a further specific aspect of the drill, the drill body includes a sub-cutting edge, and the sub-cutting edge is configured such that a groove is formed on an outer periphery surface from a vicinity of the tip of the drill body to the different level part in a periphery direction at predetermined intervals, and a cutting edge is provided on a verge end of the groove.

Furthermore, the drill body includes a sub-cutting edge, the sub-cutting edge is a boring edge that is arranged just behind a pair of the first cutting edges between both of the first cutting edges in a circumferential direction, and formed along with a scrap lead pocket, and an outer diameter of each of the sub-cutting edges is larger than an outer diameter of each of the first cutting edges.

A boring device of the present invention includes a hollow spindle serving as a spindle rotated by a driving source, and any of the drills mounted on a tip of the hollow spindle via a chuck, wherein a dust collection mechanism is coupled to a passage back end in the hollow spindle, a work material is bored while the driving source rotates the drill through the hollow spindle, chips produced during boring performed by the first cutting edge of the drill are sucked in the chip exhaust through the first scrap lead pocket, chips produced during boring performed by the second cutting edge of the drill are sucked in the chip exhaust through the second scrap lead pocket, and the chips sucked in the chip exhaust are suction-recovered in the dust collection mechanism through a passage in the hollow spindle.

As a specific configuration of the boring device, the hollow spindle has a single cylindrical structure, the drill is mounted on a tip of the single cylinder spindle via the chuck, and the dust collection mechanism is coupled to a back end of the single cylinder spindle.

On the other hand, as long as the driving source is a rotary motor that rotates a single cylinder spindle, a type or a structure of the driving source is not particularly restricted. However, in consideration of downsizing of the device, it is preferable to employ a hollow motor arranged in a housing of the device. In this case, the single cylinder spindle is rotatably incorporated in a rotor of the hollow motor (claim 6).

As a preferred embodiment, the driving source is a combination of the hollow motor and the feed motor, thereby enabling automated feeding corresponding to the thickness, the quality of the material, or the like of the work material. In the combination of the hollow motor and the feed motor, the both motors are coaxially arranged to enable a compact structure. Alternatively, in consideration of productivity, the feed motor is arranged at a lower position near the hollow motor. In either structure, the feed motor causes the hollow motor to move forward and backward by a feed function, thereby enabling pitch feeding of the hollow spindle and the drill.

According to the present invention, a countersink, a chamfering, a counter boring hole, or the like is formed together with boring of a work material without replacement of a drill, and hence work efficiency and process accuracy of a boring process can be enhanced. Additionally, a drill structure in which a drill body has a chip exhaust therein is utilized, and hence a cutting edge and a scrap lead pocket can be relatively easily and variously formed, and a boring device easily mounted with a dust collection mechanism can be obtained.

Embodiments of the present invention will be described. Each configuration of a drill of the present invention and boring steps thereof will be described with reference to FIG. 1 to FIG. 8, and a boring device of the present invention will be described with reference to FIG. 9 and FIG. 10.

Figure 1:
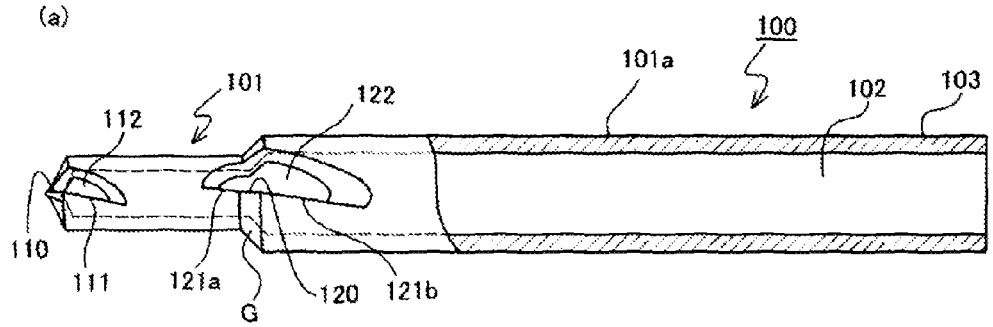
FIG. 1(a) is a partially cut-out side elevational view of a drill of a first embodiment.
FIG. 1(b) is a front elevational view thereof.
FIG. 1(c) is a plan view.
FIG. 1(d) is a sectional view taken along the line (d)-(d) in FIG. 1(c)
Figure 1:
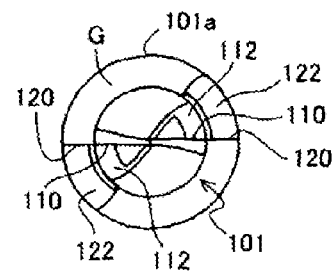
Figure 1:
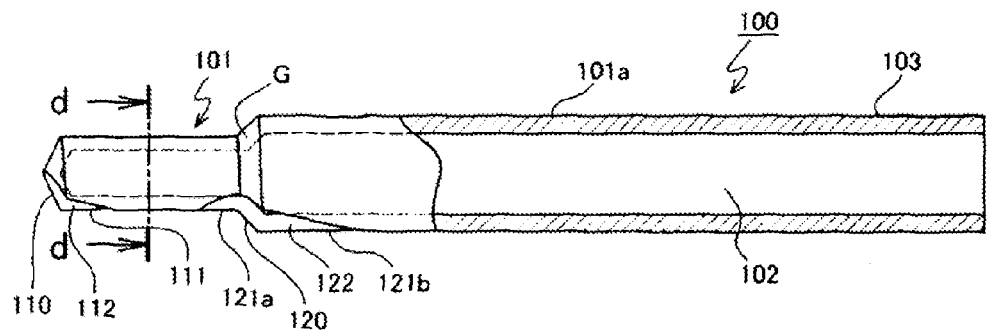
Figure 1:
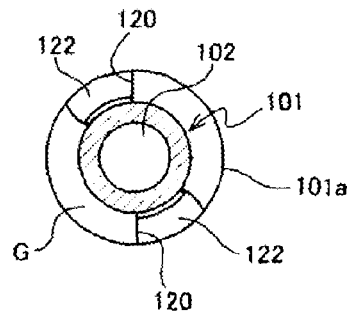

FIG. 1 shows a drill 100 of a first embodiment, and a drill body 101 is a basic configuration.

The drill body 101 has a tip-blocked shaped narrow cylindrical form in which a tip is blocked with a tip surface (tip head) having a predetermined tip angle, and a chip exhaust 102 is formed over the whole length inside the drill body. This drill body 101 is integrated with a large-diameter cylindrical body 101a having an outer diameter increased via a different level part G on a base end side (back side) at a predetermined interval from the tip, and the back part of the large-diameter cylindrical body 101a is used as a shank 103.

The different level part G of the drill body 101 is an inclined surface with an outer diameter gradually increasing toward the base end side.

The drill body 101 forms first cutting edges 110 on the tip surface thereof, and forms second cutting edges 120 on the different level part G formed from the inclined surface.

As the first cutting edges 110, a case where a pair of cutting edges is formed by the tip angle of the tip surface, specifically a pair of cutting edges 110 are formed from respective ends of chisel edges toward an outer peripheral end is exemplified. Similarly, as the second cutting edges 120, a case where a pair of cutting edges 120 are formed on both sides with respect to the center of drill rotation in the inclined different level part G is exemplified.

The first cutting edges 110 and the second cutting edges 120 each are prepared by pressing a cutting edge tool against the drill body 101 at a predetermined angle to form cuts, and the cuts formed by the cutting edge tool form first scrap lead pockets 112 near the first cutting edges 110, and form second scrap lead pockets 122 near the second cutting edges 120.

Each first scrap lead pocket 112 is a notched hole part which is opened toward a rotating direction front side with respect to a reference verge of the first cutting edge 110 and a verge line 111 extending on the outer periphery of the drill body 101, and the first cutting edge 110 faces the chip exhaust 102 via this first scrap lead pocket 112.

Similarly, each second scrap lead pocket 122 is a notched hole part which is opened toward a rotating direction front side with respect to a reference verge of the second cutting edge 120 and verge lines 121a and 121b extending on the outer periphery of the drill body 101, and the second cutting edge 120 faces the chip exhaust 102 via this second scrap lead pocket 122.

Consequently, in a boring step performed by the drill 100, chips produced in a step of boring a work material W with the first cutting edges 110 are exhausted to the chip exhaust 102 inside the drill body 101 through the first scrap lead pockets 112, and chips produced in a subsequent step of boring the work material W with the second cutting edges 120 are exhausted to the chip exhaust 102 inside the drill body 101 through the second scrap lead pockets 122.

Figure 2:
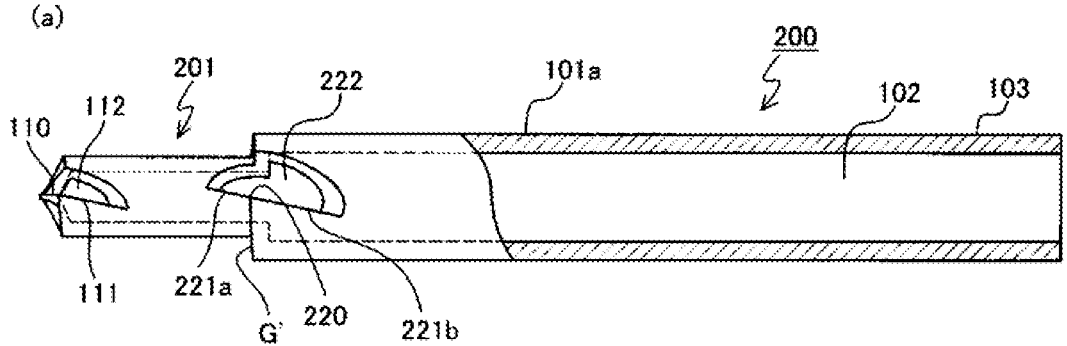
FIG. 2(a) is a partially cut-out side elevational view of a drill of a second embodiment.
FIG. 2(b) is a front elevational view thereof.
FIG. 2(c) is a plan view.
FIG. 2(d) is a sectional view taken along the line (d)-(d) in FIG. 2(c)
Figure 2:
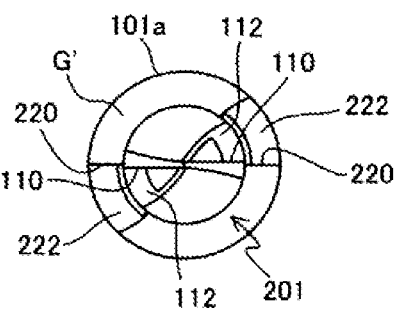
Figure 2:
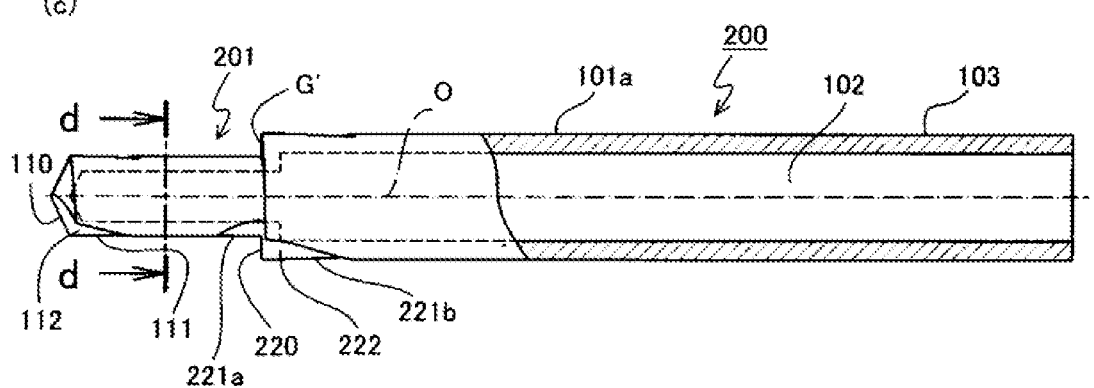
Figure 2:
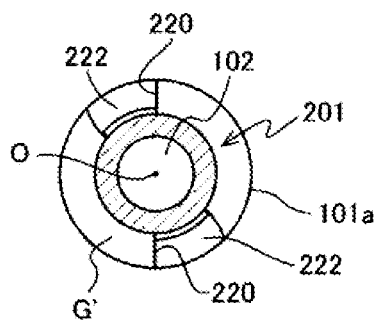

FIG. 2 shows a drill 200 of a second embodiment. Similarly to the first embodiment, a drill body 201 includes a large-diameter cylindrical body 101a, a chip exhaust 102, and a shank 103, and further includes first cutting edges 110 and first scrap lead pockets 112. In order to redundant description, the same components are denoted by the same reference numerals in the figures, and description thereof will be omitted.

This drill 200 is different from the drill of the first embodiment in the shape of a different level part and the shape of second cutting edges 220 related to the different level part.

That is, a different level part G' of the drill body 201 is a perpendicular surface orthogonal to an axis O of the drill body 201, in place of an inclined surface, as shown in FIG. 2(c). In other words, a tip surface of the large-diameter cylindrical body 101a is a vertical surface, the second cutting edges 220 are formed on the vertical surface, and second scrap lead pockets 222 each are formed by opening a notched hole part toward a rotating direction front side with respect to a reference verge of verge lines 221a and 221b where the front and back of the second cutting edges 220 extend on the outer periphery of the drill body 201.

Also in a boring step performed by this drill 200, chips produced in a step of boring a work material W with the first cutting edges 110 are exhausted to the chip exhaust 102 inside the drill body 201 through the first scrap lead pockets 112, and chips produced in a subsequent step of boring the work material W with the second cutting edges 220 are exhausted to the chip exhaust 102 inside the drill body 201 through the second scrap lead pockets 222.

Figure 3:
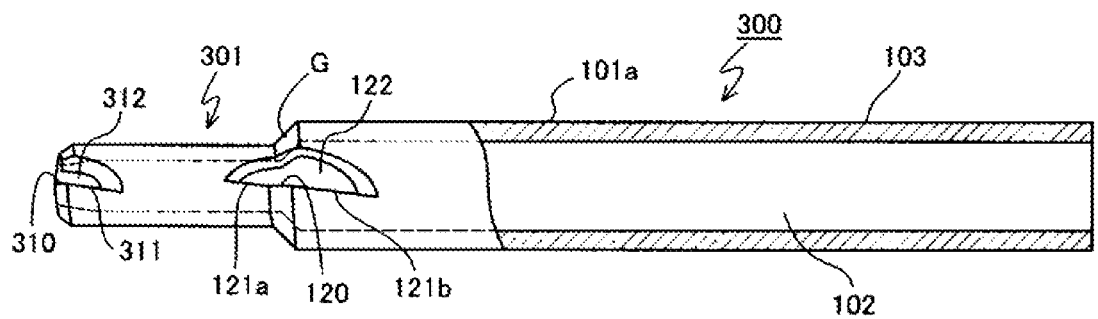
FIG. 3(a) is a partially cut-out side elevational view of a drill of a third embodiment.
FIG. 3(b) is a front elevational view thereof.
FIG. 3(c) is a plan view.
FIG. 3(d) is a sectional view taken along the line (d)-(d) in FIG. 3(c)
Figure 3:
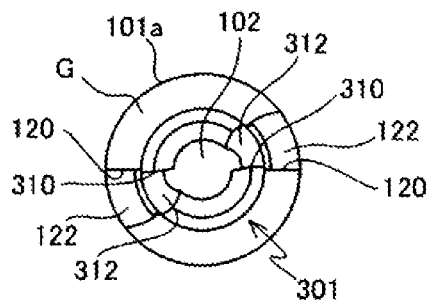
Figure 3:
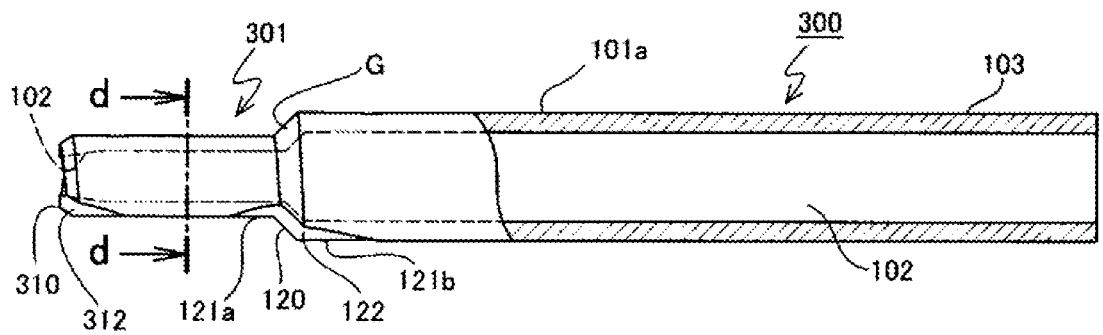
Figure 3:
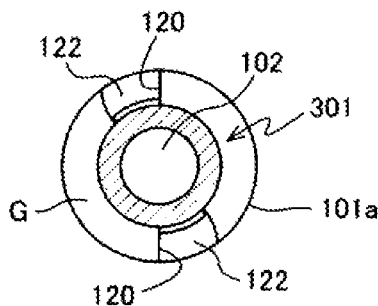

FIG. 3 shows a drill 300 of a third embodiment. Similarly to drill 100 of the first embodiment, a drill body 301 includes a large-diameter cylindrical body 101a, a chip exhaust 102, and a shank 103, and further includes second cutting edges 120 and second scrap lead pockets 122 on a different level part G formed by an inclined surface. In order to avoid redundant description, the same components are denoted by the same reference numerals in the figures, and description thereof will be omitted.

This drill 300 is different from the drill of the first embodiment in that a tip surface of the drill body 301 is opened, namely, the drill body has a cylindrical drill structure where the chip exhaust 102 is an inner passage which penetrates over the whole length, similarly to Patent Document 1-4, and with this structure, first cutting edges 310 each are formed on a tip verge of the drill body 301, and each of first scrap lead pockets 312 formed on a rotating direction front side with respect to a verge line 311 has a notched shape with a tip opened.

Similarly to the first embodiment, in a boring process performed by the drill 300 chips produced in a step of boring a work material W with the first cutting edges 310 are exhausted to the chip exhaust 102 inside the drill body 301 through a tip opening and the first scrap lead pockets 312 of the drill body 301, and chips produced in a subsequent step of boring the work material W with the second cutting edges 120 are exhausted to the chip exhaust 102 inside the drill body 301 through the second scrap lead pockets 122.

Although illustration and description will be omitted, also in the drill 300, the different level part G formed by an inclined surface is arbitrarily placed with the different level part G' formed by a vertical surface, and the second cutting edges 220, and the second scrap lead pockets 222 are arbitrarily formed on the different level part G', like the second embodiment in FIG. 2.

Figure 4:
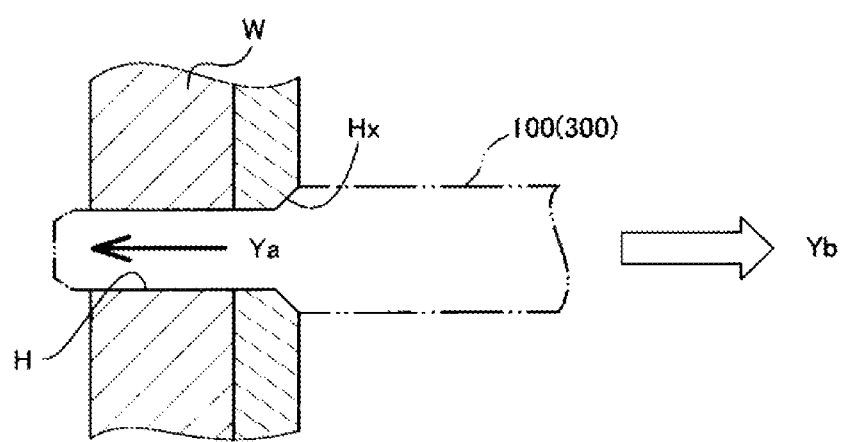
FIG. 4 is a sectional view where a countersink (chamfering) process is performed for a work material.
Figure 5:
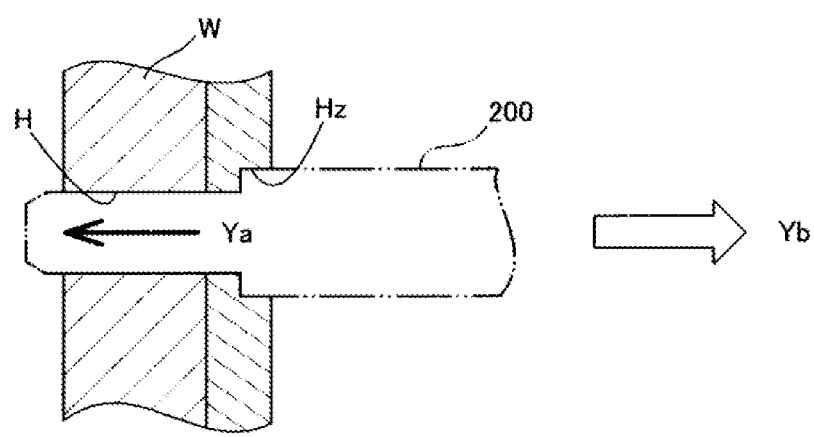
FIG. 5 is a sectional view where a counter boring hole process is performed for a work material.

FIG. 4 and FIG. 5 show process examples where the work material W such as a CFRP material is bored by using the drill 100 to 300. FIG. 4 shows an example of a countersink process of forming a countersink (or chamfering) Hx along with a through hole H on the work material W, and FIG. 5 shows an example of a counter boring hole process of forming a through hole H along with a counter boring hole Hz.

In FIG. 4, the work material W is bored along arrow Ya by using the drill 100 or 300, and the work material W is bored by the first cutting edges 110 (310) to form the through hole H. Additionally, in a last end area in the boring step where the through hole H penetrates, the upper part of the work material W is cut by the second cutting edges 120, so that the countersink Hx is formed as shown in the figure. During this boring step, chips cut by the first cutting edges 110 (310), and the second cutting edges 120 are exhausted along arrow Yb from the drill base end through the chip exhaust 102 inside the drill body.

The work material W for which this countersink process is performed is useful as a joint for plate member by a rivet.

The length of the different level (inclined surface) G of the drill 100 or 300 is shortened, or the boring length of the different level G is shortened, so that a chamfering process can be performed for forming not a countersink but a smooth chamfering on the inlet end of the through hole H.

Similarly, in FIG. 5, the work material W is bored along arrow Ya by using the drill 200, and the work material W is bored by the first cutting edges 110 to form the through hole H. Additionally, in a last end area in the boring step where the through hole H penetrates, the upper part of the work material W is cut by the second cutting edges 220, so that the countersink Hz is formed as shown in the figure.

The work material W for which this counter boring hole process is performed is useful as a joint for plate member by a rivet or a bolt.

Even when the modification (where the different level part G of the drill 300 is replaced with the different level part G' configured from a vertical surface) is used in place of the drill 200, a similar counter boring hole process is possible.

Figure 6:
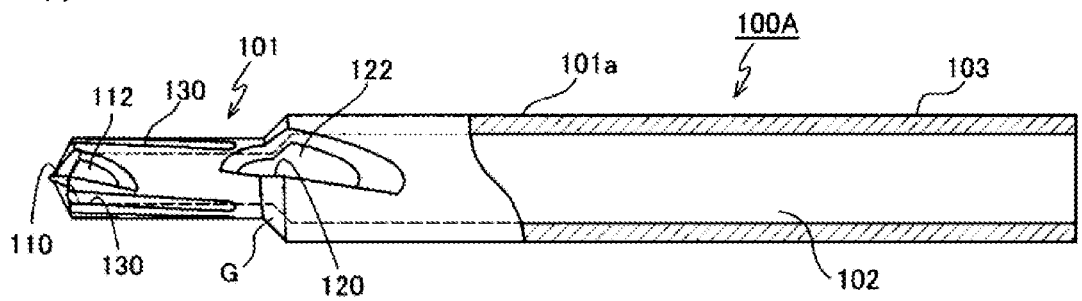
FIG. 6(a) is a partially cut-out side elevational view of a drill of a fourth embodiment.
FIG. 6(b) is a front elevational view thereof.
FIG. 6(c) is a plan view.
FIG. 6(d) is a sectional view taken along the line (d)-(d) in FIG. 6(c)
Figure 6:
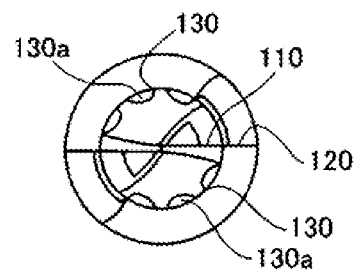
Figure 6:
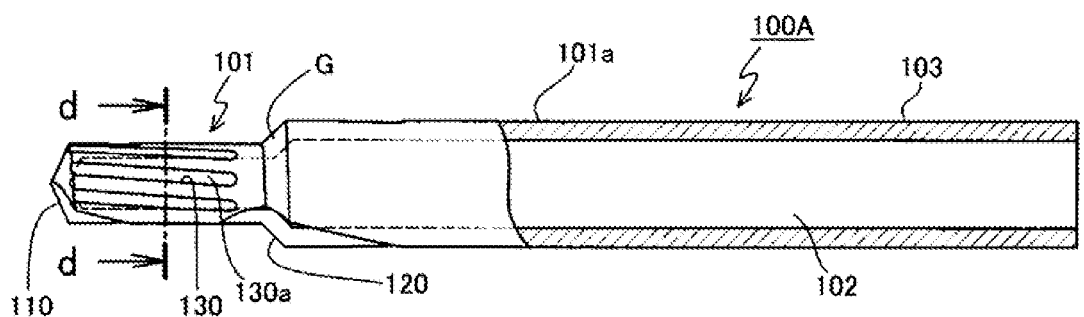
Figure 6:
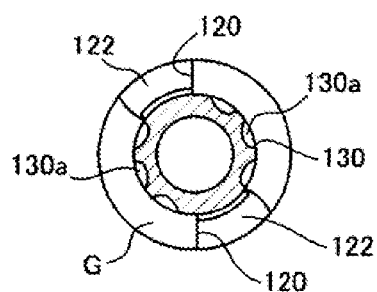

FIG. 6 shows a drill 100A of a fourth embodiment. This drill 100A has the same basic configuration as the drill 100 of FIG. 1 (first embodiment), and is different from the drill 100 in that a drill body 101 is formed with sub-cutting edges 130. For convenience of explanation, the same configurations as the drill 100 are denoted by the same reference numerals in the figures, and description thereof will be omitted.

The sub-cutting edges 130 are configured such that cutting edges are provided on groove verges by forming grooves 130a on an outer periphery surface from the vicinity of the tip of the drill body 101 to the vicinity of the different level part G in a periphery direction at predetermined intervals. Each of the sub-cutting edges 130, namely, each of grooves 130a is preferably formed in an inclined shape where the tip precedes the rotating direction front side as shown in the figure, and the sectional shape of the groove 130a is preferably changed such that the rake angle of the sub-cutting edges 130 gradually reduces toward the rotating direction. Consequently, the cutting property of the sub-cutting edges 130 can be improved.

According to the drill 100A of the fourth embodiment, although not limited, an negative effect that is likely to occurs on the work material W intended for a CFRP material, namely, an negative effect that the frictional resistance of the drill outer periphery surface is increased because a drill hole bored with the first cutting edges 110 contract in cutting is solved by reducing frictional heat during the boring process by the action of the sub-cutting edges 130, and an altered layer can be prevented from generating on a hole inner surface.

In FIG. 6, the case where the sub-cutting edges 130 are added in the drill of FIG. 1 (first embodiment) is exemplified. However, the present invention is not limited to this, and the sub-cutting edges 130 can be applied to the drill of FIG. 2 (second embodiment), or FIG. 3 (third embodiment).

Figure 7:
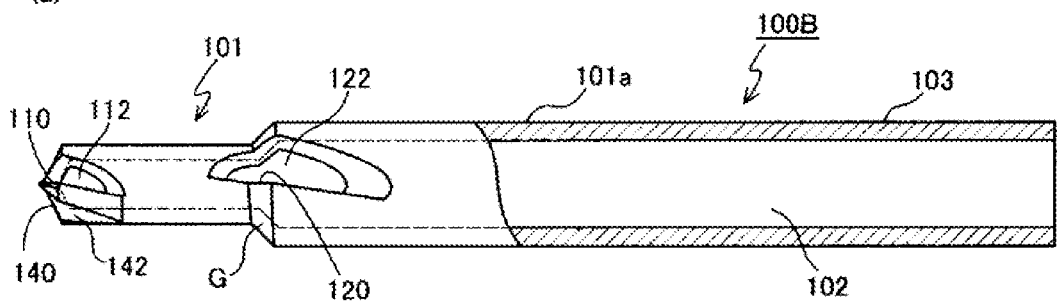
FIG. 7(a) is a partially cut-out side elevational view of a drill of a fifth embodiment.
FIG. 7(b) is a front elevational view thereof.
FIG. 7(c) is a plan view.
FIG. 7(d) is a sectional view taken along the line (d)-(d) in FIG. 7(c)
Figure 7:
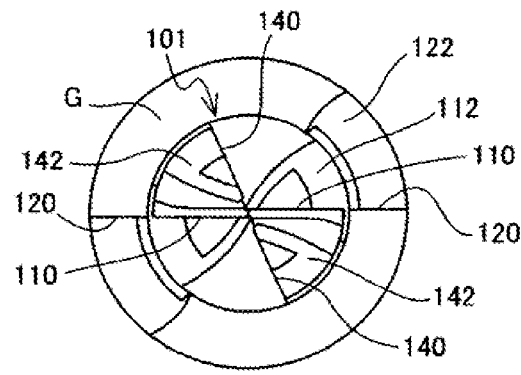
Figure 7:
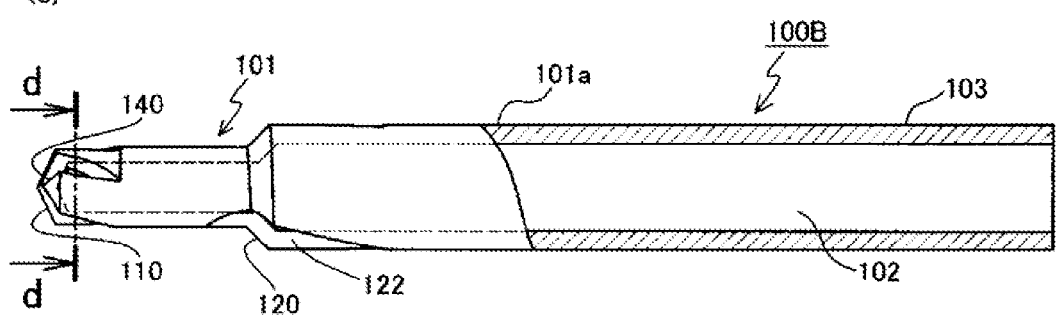
Figure 7:
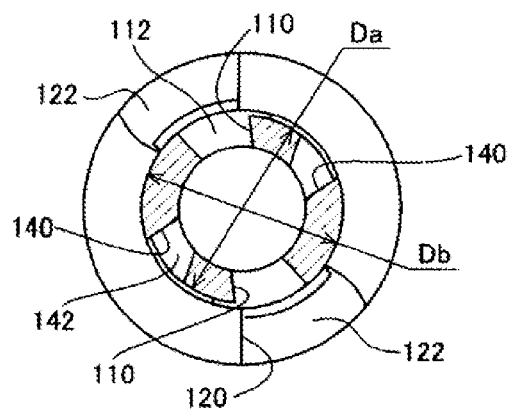

FIG. 7 shows a drill 100B of a fifth embodiment. This drill 100B has also the same basic configuration as the drill 100 of FIG. 1 (first embodiment), and is different from the drill 100 in that a drill body 101 is formed with sub-cutting edges 140. For convenience of explanation, the same configurations as the drill 100 are denoted by the same reference numerals in the figures, and description thereof will be omitted.

The sub-cutting edges 140 are boring edges that are arranged just behind a pair of first cutting edges 110 between both cutting edges 110 in a circumferential direction, and are formed along with small scrap lead pockets 142. As shown in FIG. 7(b) and FIG. 7(d), the outer diameter Db of each sub-cutting edge 140 is larger than the outer diameter Da of the first cutting edge 110, namely the outer diameter Da of each first cutting edge 110 is smaller than the outer diameter Db of each sub-cutting edge 140.

Figure 8:
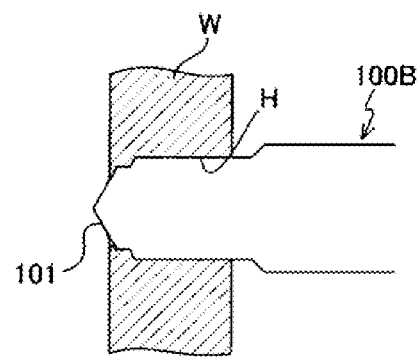
FIG. 8 is a sectional view showing the progress of a boring process performed by the drill of FIG. 7 (fifth embodiment)
Figure 8:
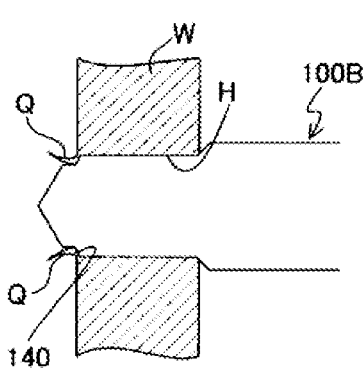
Figure 8:
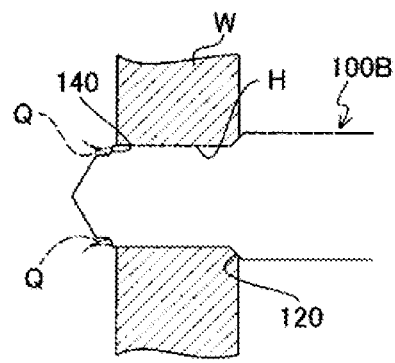
Figure 8:
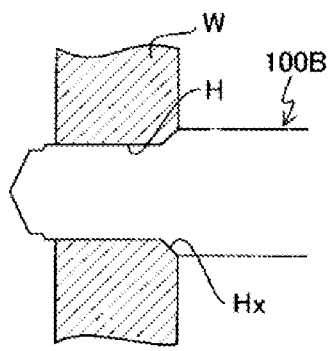

According to the drill 100B of the fifth embodiment, it is possible to prevent occurrence of burrs which are likely to occur on the work material W intended for a CFRP material. That is, in a case where a boring process is performed for the work material W by using the drill 100B as shown in FIG. 8 (1), at a stage where the drill 100B penetrates the work material W to form a through hole H, burrs Q are sometimes caused by boring with first cutting edges 110 as shown in FIG. 8 (2), but are cut and removed by the boring action of the subsequent sub-cutting edges 140 as shown in FIG. 8 (3). The subsequent FIG. 8 (4) shows a state where a countersink Hx is formed after penetration of the through hole H.

Although FIG. 7 exemplifies a case where the sub-cutting edges 140 are added to the drill of FIG. 1 (first embodiment), the present invention is not limited to this. The sub-cutting edges 140 may be applied to the drill of FIG. 2 (second embodiment).

In the respective embodiments, the first cutting edges 110, 310 and the second cutting edges 120, 220 of the respective drills each are a pair of edges, namely two edges arranged on the both sides with respect to the rotation center, thereby ensuring stability of drill rotation during boring, and facilitating preparation of the edge parts. However, the present invention is not necessarily limited to this, and includes a single edge, three edges, four edges, etc. like conventional drills.

Additionally, the case where the second cutting edges 120, 220 are arranged on the same circumference as the first cutting edges 110, 310 as shown in the figures is exemplified, but the second cutting edges 120, 220 are arbitrarily displaced by a predetermined angle, for example, 90 degrees, etc.

Then, the drill bodies 101, 201, 301 each are prepared with a superhard material such as a cemented carbide and a high speed steel. As to the cutting edge parts, namely the first cutting edges 110, 310, the second cutting edges 120, 220, and the sub-cutting edges 140, edge part surfaces formed by an ultra-high pressure sintered compact, a diamond edge tip, or a base material such as a ceramic material and a silicon carbide composite material is subjected to diamond coating to prepare cutting edges, and the prepared cutting edges are attached at predetermined positions by brazing, or the like.

Figure 9:
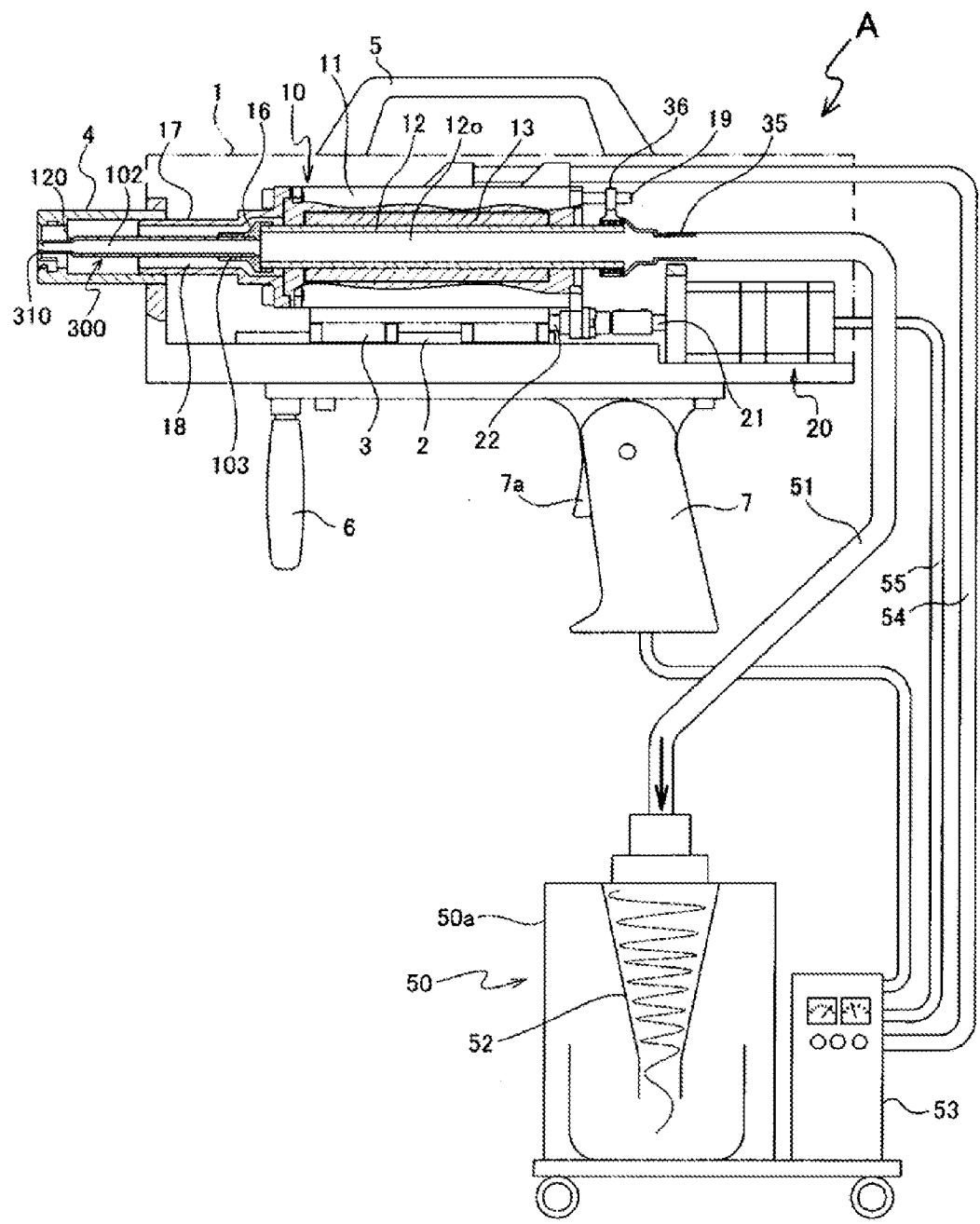
FIG. 9 is a side elevational view schematically showing a cut-out part of a boring device of the present invention.
Figure 10:
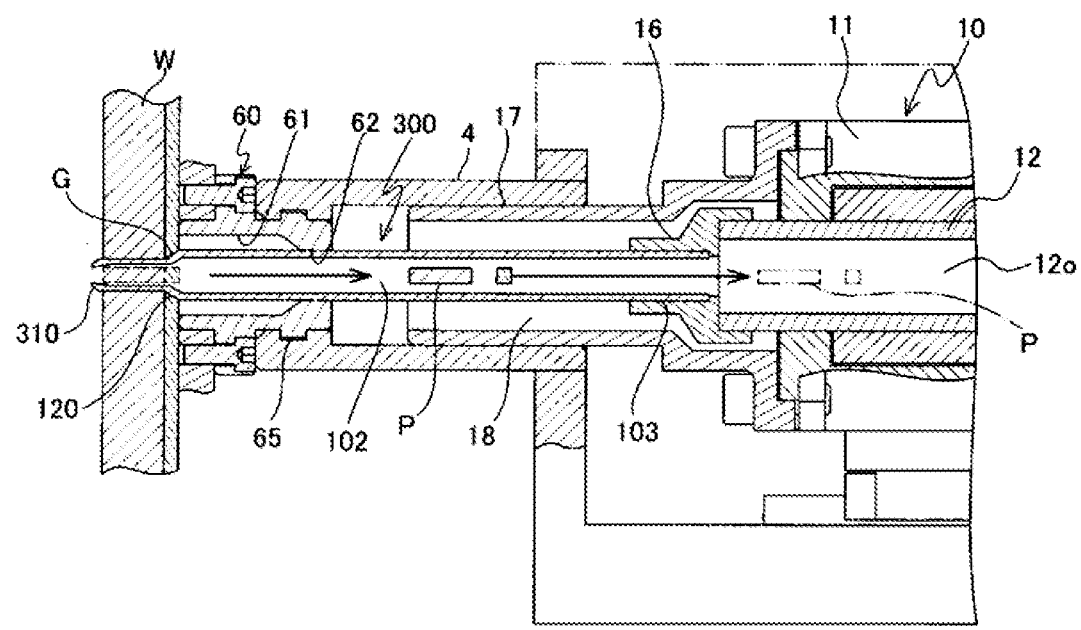
FIG. 10 is an enlarged side elevational view of a device tip part, showing a state where a process for boring a work material is being performed.

Description of an embodiment of a boring device using the drill of the present invention will cover a case of a hand-held drill device A, with reference to FIG. 9 and FIG. 10.

FIG. 9 is a partial cut-out side elevational view schematically showing a main part of the device A, and exemplifies a configuration where a hollow motor 10 and a feed motor 20 serve as a driving source are mounted inside a housing 1.

The housing 1 is a substantially rectangular housing, and is provided, on an inner bottom surface, with rails 2 extending in a front-back direction (the horizontal direction in the figure) at an interval right and left (the depth direction in the figure), and a sliding block 3 of the hollow motor 10 is slidably mounted on the rails 2. Although not shown in the drawing, a plurality of guide members are provided above the rails 2 in the housing 1, and the upper part of the hollow motor 10 is slidably supported on the guide members. Consequently, the hollow motor 10 is arranged on the substantial center area in the housing 1 so as to be movable frontward and backward.

The feed motor 20 is placed on the back part bottom surface of the housing 1, and engages with the hollow motor 10 such that the motor 10 moves frontward and backward.

The types of the hollow motor 10 and the feed motor 20 are not particularly limited. This embodiment exemplifies a case where a servo motor is used for the hollow motor 10, and a pulse motor integral with a screw shaft is used for the feed motor 20.

The hollow motor 10 integrally includes a machine spindle (spindle) on a hollow shaft part in a motor case 11. A single cylinder spindle 12 that is formed with only a passage 12o which penetrates along a center of an axis serves as the spindle, and the hollow motor 10 rotatably incorporated by integrally coupling the outer periphery surface of the spindle 12 with a rotor 13. In the feed motor 20, a feed screw 22 coupled to a rotation driving shaft 21 extends below the bottom surface of the hollow motor 10, and the feed screw 22 is screwed with a feed nut (not shown) provided on the bottom of the hollow motor 10, so that the hollow motor 10 is moved in the front-back direction by rotation of the feed motor 20.

The single cylinder spindle 12 is provided with a collet chuck 16 on the tip thereof, and is mounted with the drill such that any of the drills is detachably replaced by the chuck 16, and connects a dust collection hose 51 connected to a dust collection mechanism 50.

As the drill, any drill may be arbitrarily employed. For convenience of explanation, a case where the drill 300 of FIG. 3 (third embodiment) is used is exemplified.

A first hood 17 that covers the front portion of the collet chuck 16 provided on the tip of the single cylinder spindle 12 is provided on the tip of the hollow motor 10, a second hood 4 that covers the front portion of the first hood 17 is mounted on the tip of the housing 1, and the first hood 17 is mounted so as to be slidably fitted with the second hood 4. That is, the first hood 17 and the second hood 4 cover and protect the outer periphery of the drill 300 mounted on the collet chuck 16.

The first hood 17 and the second hood 4 may be formed integrally with the motor case 11, and the housing 1, but preferably detachably mounted as separate members.

On the other hand, a connector 35 is mounted on the back end of the single cylinder spindle 12, and connected to a dust collection mechanism 50 to the connector 35 via the dust collection hose 51.

This connector 35 causes an arm 36 to be locked to a rotation stopper 19 that protrudes from a case 11 of the hollow motor 10, thereby preventing rotation.

The dust collection mechanism 50 is configured by a dust collector 50a including a suction function, the dust collection hose 51 that extends from the dust collector 50a, and the like. In the dust collection mechanism 50, the dust collection hose 51 is connected to the single cylinder spindle 12 to allow suction, so that powerful suction force is generated on the tip of the chip exhaust 102 of the drill 300 via the passage 12o of the spindle 12, and chips and the like generated during boring of the first cutting edges 310 by the suction are recovered in the dust collector 50a. This dust collection mechanism 50 preferably has a configuration where a cyclone 52 is incorporated in the dust collector 50a, thereby further effectively suctioning the recovered chips and the like.

A reference numeral 53 shown in FIG. 9 is a controller incorporated with a power supply and a control unit, is connected to the hollow motor 10 and the feed motor 20 that are driven and controlled by this controller 53, with wiring cords 54 and 55.

Since the case where the drill device A is a hand-held drill device is exemplified, as shown in FIG. 9, a handle for carrying 5 used when carried is provided on the upper surface of the housing 1, and a handle rod 6 that serves as a support during a boring process, and an operation rod 7 that controls start-up and stop of the hollow motor 10, and the feed motor 20 are provided on the bottom surface, so that the controller 53 is operated by the operation rod 7. That is, while the drill device A is a hand-held drill device, the device that is systematized by connecting auxiliary devices such as the dust collection mechanism 50 and the controller 53 to the hollow motor 10, etc. being a boring main portion is exemplified.

As to a process status of boring work performed by using the drill device A, a case where CFRP is bored as the work material W is shown. In this case, a jig 60 fixed on the surface of the work material W along this surface is mounted, and the drill device A is set to the jig 60 (see FIG. 10).

The structure of the jig 60 is not necessarily limited, but a support cylindrical structure having a cavity part 61 is exemplified as the structure, and an insertion port 62 that enables insertion of the drill 300 by consistency of the drill 300 and the center of an axis is opened on the tip surface of the cavity part 61. A lock verge 65 that is fit with the tip part of the second hood 4 protruding on the front portion of the housing 1, and locks the second hood 4 by slight rotation is provided on the tip outer periphery of the jig 60.

Thus, a worker holds the handle rod 6 and the operation rod 7, fits the second hood 4 with the tip part of the jig 60 to lock to the lock verge 65, so that the drill device A is set to the jig 60. Then, the worker turns on a startup switch 7a attached to the operation rod 7, so that a boring process starts.

First, by startup of the feed motor 20, the drill 300 moves forward along with the hollow motor 10 to enter from the insertion port 62 of the jig 60 in the cavity part 61.

Then, at appropriate timing, the hollow motor 10 starts, and the drill 300 rotates the number of rotation that is set, via the single cylinder spindle 12. The drill 300 further moves forward, the first cutting edges 310 come into contact with the work material W, and a boring process, namely a boring process starts.

That is, as shown in FIG. 10, the drill 300 proceeds while remaining a core portion of the work material W and cutting the outer periphery by rotation of the first cutting edges 310. With the boring process, chips are produced around the first cutting edges 310. These chips are reliably sucked in the chip exhaust 102 through the periphery of the first cutting edges 310, namely the tip opening and the first scrap lead pockets 312, by strong suction force resulting from a negative pressure condition of the inside of the chip exhaust 102 by the dust collection mechanism 50, and recovered from the chip exhaust 102 to the dust collector 50a via the passage 12o of the single cylinder spindle 12, and the dust collection hose 51.

Then, until the through hole H penetrates, the dust collection recovery of the chips continues in a similar manner, and in the boring last end area where the through hole H penetrates, a core portion is hollowed out from the work material W, and a cut core P which is a cylindrical (short columnar) chip with a diameter smaller than the chip exhaust 102 is formed. This cut core P is recovered together with chips from the chip exhaust 102 to the dust collector 50a via the passage 12o, and the dust collection hose 51, by the strong suction force resulting from the negative pressure condition of the inside of the chip exhaust 102.

In the last end area of the boring step, the second cutting edges 120 bore the work material W to form the countersink Hx. Similarly, chips produced at this stage are sucked in the chip exhaust 102 inside the drill body 301 through the second scrap lead pockets 122, and recovered in the dust collector 50*a* via the passage 12*o* of the single cylinder spindle 12, and the dust collection hose 51.

Accordingly, during the boring process performed by using the drill 300, chips and a cut core produced can be reliably recovered, and hence working environment can be improved. Additionally, since the hollow spindle has a single cylindrical structure, the outer diameter of the single cylinder spindle 12 can be reduced, and hence the hollow motor 10 can be downsized.

Operation setting such as startup timing of the hollow motor 10 and the feed motor 20 is set by the controller 53, and is not necessarily coincide with the description of the process status. Therefore, the operation setting is arbitrarily changed. Particularly, the number of rotation of the hollow motor 10, the feed speed and the feed amount of the feed motor 20, and the like are set in consideration of the material or the thickness of the work material W.

Although the figure shows the case where the operation rod 7 is provided with only the single startup switch 7*a*, startup switches of the hollow motor 10 and the feed motor 20 may be separately provided, and a worker may determine appropriate startup of the both motors 10, 20 depending on the progress status of boring work.

The case where the drill 300 of FIG. 3 (third embodiment) is used as a drill in the drill device A is described. According to this, as described above, most chips can be collected and recovered as the cut core P, and hence a dust collection function can be improved. However, in the present invention, the used drill is not limited to this. Also when the drill 100, the drill 200, the drill 100A, or the drill 100B is used, a boring and a countersink process or a counter boring process can be similarly performed. Also in such a case, chips produced during these processes can be recovered in the dust collector 50*a* through the chip exhaust 102 of the drill body and via the passage 12*o* of the single cylinder spindle 12, and the dust collection hose 51.

Additionally, the case where the single cylinder spindle 12 is used as a hollow spindle in the drill device A is exemplified. The hollow spindle is not limited to this, and may have a double cylindrical structure configured from an inner passage and an outer passage. In this case, an air supply mechanism that feeds compressed air is coupled to the outer passage of the double cylindrical spindle, a dust collection mechanism is coupled to the back end of the inner passage, and a work material is bored while compressed air fed through the outer passage is sucked in the inner passage from the periphery of the cutting edges of the drill, so that chips and a cut core produced can be suction-recovered in the dust collection mechanism through the inner passage.

In the embodiment, CFRP is used as a work material. However, the work material is not limited to this, and FRP, or other fiber reinforced composite material may be used as the work material. Alternatively, in a case where a drill including a cutting edge with high strength is used, an Al alloy or other metal material may be used as the work material. Furthermore, depending on the work material, the present invention is arbitrarily applicable to a boring process where only chips are produced without hollowing out a cut core.

In the embodiment, two of the rotary motor (hollow motor) 10 and the feed motor 20 are mounted as a driving source. However, the driving source is not limited to this, and the feed motor 20 is arbitrarily omitted. Moreover, the case of the hand-held drill device is exemplified, but the drill device is not restricted to this. An automated system where the drill device is incorporated in a robot may be applied.

EXPLANATION OF LETTERS AND NUMERALS

100: drill
101: drill body
101*a*: large-diameter cylindrical body
102: chip exhaust
103: shank
G: different level part
110: first cutting edge
111: verge line
112: first scrap lead pocket
120: second cutting edge
121*a*, 121*b*: verge line
122: second scrap lead pocket
200: drill
201: drill body
G': different level part
0: axis
220: second cutting edge
221*a*, 221*b*: verge line
222: second scrap lead pocket
300: drill
301: drill body
310: first cutting edge
311: verge line
312: first scrap lead pocket
120: second cutting edge
121*a*, 121*b*: verge line
122: second scrap lead pocket
W: work material
H: through hole
Hx: countersink
Hz: counter boring hole
Ya, Yb: arrow
100A: drill
130: sub-cutting edge
130*a*: groove
100B: drill
140: sub-cutting edge
142: scrap lead pocket
Q: burr
A: drill device
10: hollow motor
11: motor case
12: single cylinder spindle
12*o*: passage in single cylinder spindle
16: collet chuck
20: feed motor
40: air supply mechanism
41: air supply hose
50: dust collection mechanism
51: dust collection hose
P: cut core

What is claimed is:

1. A drill having an inner passage that is formed along a center of an axis in a drill body and serves as a chip exhaust, the drill comprising:
   a large-diameter cylindrical body having an outer diameter increased via a different level part, and coaxially provided on a base end side of the drill body;
   a first cutting edge provided on a tip part of the drill body and a first scrap lead pocket being opened toward a rotating direction front side of a verge line that extends backward from the first cutting edge and leading to said chip exhaust;

a second cutting edge provided on said different level part and a second scrap lead pocket being opened toward a rotating direction front side of verge lines that extend forward and backward from the second cutting edge and leading to said chip exhaust; and a boring edge and a boring edge scrap lead pocket that are arranged just behind said first cutting edge, wherein an outer diameter of said boring edge is larger than an outer diameter of said first cutting edge.

2. The drill according to claim 1, wherein said different level part is an inclined surface gradually increasing an outer diameter toward the base end side, and the second cutting edge is for a countersink process or a chamfering process, which is formed on the inclined surface.

3. The drill according to claim 1, wherein said different level part is a perpendicular surface orthogonal to the center of an axis of the drill body, and the second cutting edge is for a counter boring process, which is formed on the perpendicular surface.

4. The drill according to claim 1, wherein said drill body includes a sub-cutting edge, and said sub-cutting edge is configured such that a groove is formed on an outer periphery surface from a vicinity of the tip of said drill body to said different level part in a periphery direction at predetermined intervals, and a cutting edge is provided on a verge end of said groove.

5. A boring device comprising:

a hollow spindle serving as a spindle rotated by a driving source; and the drill according to claim 1 mounted on a tip of the hollow spindle via a chuck, wherein a dust collection mechanism is coupled to a passage back end in said hollow spindle, a work material is bored while said driving source rotates said drill via the hollow spindle, chips produced during boring performed by the first cutting edge of said drill are sucked in the chip exhaust through the first scrap lead pocket, chips produced during boring performed by the second cutting edge of said drill are sucked in the chip exhaust through the second scrap lead pocket, and the chips sucked in the chip exhaust are suction-recovered in the dust collection mechanism through a passage in said hollow spindle.

6. The boring device according to claim 5, wherein said hollow spindle has a single cylindrical structure, said drill is mounted on a tip of the single cylinder spindle via the chuck, and the dust collection mechanism is coupled to a back end of the single cylinder spindle.

7. The boring device according to claim 5, wherein said driving source is a hollow motor arranged in a housing, and said hollow spindle is rotatably coupled in a rotor of the hollow motor.

8. The boring device according to claim 5, wherein said driving source is a combination of a hollow motor and a feed motor arranged in a housing, said hollow spindle is rotatably coupled in a rotor of the hollow motor, and the feed motor causes said hollow spindle to move forward and backward to enable pitch feeding of said drill.

9. The drill according to claim 2, wherein said drill body includes a sub-cutting edge, and said sub-cutting edge is configured such that a groove is formed on an outer periphery surface from a vicinity of the tip of said drill body to said different level part in a periphery direction at predetermined intervals, and a cutting edge is provided on a verge end of said groove.

10. The drill according to claim 3, wherein said drill body includes a sub-cutting edge, and said sub-cutting edge is configured such that a groove is formed on an outer periphery surface from a vicinity of the tip of said drill body to said different level part in a periphery direction at predetermined intervals, and a cutting edge is provided on a verge end of said groove.

11. A boring device according to claim 5, wherein the different level part of said drill is an inclined surface gradually increasing an outer diameter toward the base end side, and the second cutting edge is for a countersink process or a chamfering process, which is formed on the inclined surface.

12. A boring device according to claim 5, wherein the different level part of said drill is a perpendicular surface orthogonal to the center of an axis of the drill body, and the second cutting edge is for a counter boring process, which is formed on the perpendicular surface.

13. A boring device according to claim 5, wherein said drill body includes a sub-cutting edge, and said sub-cutting edge is configured such that a groove is formed on an outer periphery surface from a vicinity of the tip of said drill body to said different level part in a periphery direction at predetermined intervals, and a cutting edge is provided on a verge end of said groove.

14. The boring device according to claim 6, wherein said driving source is a hollow motor arranged in a housing, and said hollow spindle is rotatably coupled in a rotor of the hollow motor.

15. The boring device according to claim 6, wherein said driving source is a combination of a hollow motor and a feed motor arranged in a housing, said hollow spindle is rotatably coupled in a rotor of the hollow motor, and the feed motor causes said hollow spindle to move forward and backward to enable pitch feeding of said drill.

* * * * *